(12) United States Patent
Yang

(10) Patent No.: US 7,616,457 B2
(45) Date of Patent: Nov. 10, 2009

(54) SYNCHRONOUS REGULATION CIRCUIT

(75) Inventor: Ta-yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 198 days.

(21) Appl. No.: 11/942,954

(22) Filed: Nov. 20, 2007

(65) Prior Publication Data

US 2009/0129125 A1    May 21, 2009

(51) Int. Cl.
H02M 3/335 (2006.01)
H02M 7/217 (2006.01)

(52) U.S. Cl. .................. 363/21.06; 363/127
(58) Field of Classification Search ............ 363/20, 363/21.01, 21.04, 21.06, 21.07, 21.12, 21.14, 363/21.15, 81, 127
See application file for complete search history.

(56) References Cited

U.S. PATENT DOCUMENTS

| | | | |
|---|---|---|---|
| 4,855,888 A | 8/1989 | Henze et al. | |
| 5,442,540 A | 8/1995 | Hua et al. | |
| 5,991,171 A * | 11/1999 | Cheng | 363/21.03 |
| 6,490,183 B2 * | 12/2002 | Zhang | 363/89 |
| 6,671,193 B1 * | 12/2003 | Pelkonen | 363/53 |
| 6,744,649 B1 | 6/2004 | Yang et al. | |
| 7,173,835 B1 | 2/2007 | Yang | |
| 7,408,796 B2 * | 8/2008 | Soldano | 363/127 |
| 7,542,310 B2 * | 6/2009 | Chang | 363/21.06 |
| 2006/0061338 A1 | 3/2006 | Keller | 323/222 |

FOREIGN PATENT DOCUMENTS

| | | |
|---|---|---|
| CN | 1144345 | 3/2004 |
| CN | 1262061 | 6/2006 |
| CN | 101060743 | 10/2007 |

* cited by examiner

*Primary Examiner*—Gary L Laxton
(74) *Attorney, Agent, or Firm*—J.C. Patents

(57) ABSTRACT

A primary-side switching circuit generates switching signals for switching a transformer. A secondary-side switching circuit is coupled to an output of the power converter to generate pulse signals in response to the switching signals and an output voltage of the power converter. Pulse signals are generated to rectify and regulate the power converter. A synchronous switch includes a power-switch set and a control circuit. The control circuit receives the pulse signals via capacitors for turning on/off the power-switch set. The power-switch set is connected in between the transformer and the output of the power converter. Furthermore, a flyback switch is operated to freewheel the inductor current of the power converter. The flyback switch is turned on in response to the off state of the power-switch set. The on time of the flyback switch is programmable and correlated to the on time of the power-switch set.

24 Claims, 10 Drawing Sheets

_(12) United States Patent_ US 7,616,457 B2

SYNCHRONOUS REGULATION CIRCUIT

BACKGROUND OF THE INVENTION

1. Field of the Invention

The present invention relates to power converters, and more particularly, to synchronous regulation circuit of power converters.

2. Description of Related Art

An offline power converter includes a power transformer to provide isolation from AC line input to the output of the power converter for safety. In recent developments, using soft switching topologies in the primary side of the transformer and applying the synchronous rectifier in the secondary side of the transformer, high power conversion efficiency for power converters can be achieved. Among them, the full-bridge quasi-resonant ZVS (zero voltage switching) techniques are taught in "*Constant Frequency Resonant Power Converter with Zero Voltage Switching*" by Henze et al, U.S. Pat. No. 4,855,888; "*Soft-switching PWM Converters*" by Hua et al, U.S. Pat. No. 5,442,540; and "*Zero Switching Power Converter Operable as Asymmetrical Full-bridge Converter*" by Yang, et al, U.S. Pat. No. 6,744,649. The drawback of foregoing power converters is that the pulse width of the switching signal is too short to achieve soft switching operation at light loads. Besides, the insufficient circular power causes hard switching and low efficiency. The synchronous rectifier may be equipped at the secondary side of the transformer to reduce the power loss of the diode. Detail operations of the synchronous rectifying can be referred in a prior art titled "*Control Circuit Associated with Saturable Inductor Operated as Synchronous Rectifier Forward Power Converter*" by Yang, U.S. Pat. No. 7,173,835. However, additional devices such as saturable inductors and current-sense resistor incur inevitable power consumption.

SUMMARY OF THE INVENTION

The present invention integrates a synchronous rectifying circuit with a regulation circuit to achieve higher efficiency. No additional switching stage is needed. The primary-side switching circuit, the secondary-side synchronous rectifier and the regulation circuit achieve high power conversion efficiency under various load conditions.

A synchronous regulation circuit is developed to improve the efficiency of the power converter. It includes a primary-side switching circuit, a secondary-side switching circuit, synchronous switches and a flyback switch. The primary-side switching circuit generates switching signals and synchronous signals. The switching signals are coupled to switch a transformer. The synchronous signals are coupled from the primary side of the transformer to the secondary side of the transformer via an isolation device. The secondary-side switching circuit is coupled to the output of the power converter to generate pulse signals in response to the synchronous signals and a feedback signal. The feedback signal is correlated to the output of the power converter. The pulse signals are generated for rectifying and regulating the power converter. Each synchronous switch includes a power-switch set and a control circuit. The power-switch set is coupled in between the secondary side of the transformer and the output of the power converter. The control circuit is operated to receive the pulse signals for turning on/off the power-switch set. The pulse signals are coupled from the secondary-side switching circuit to the synchronous switches via capacitors. The polarity of the pulse signals determines the on/off states of the power-switch set. The flyback switch is connected to the synchronous switches and the ground reference of the output of the power converter. The flyback switch is turned on in response to the off state of the power-switch set. The on time of flyback switch is programmable and is correlated to the on time of the power-switch set.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DETAILED DESCRIPTION OF PREFERRED EMBODIMENTS

Figure 1:
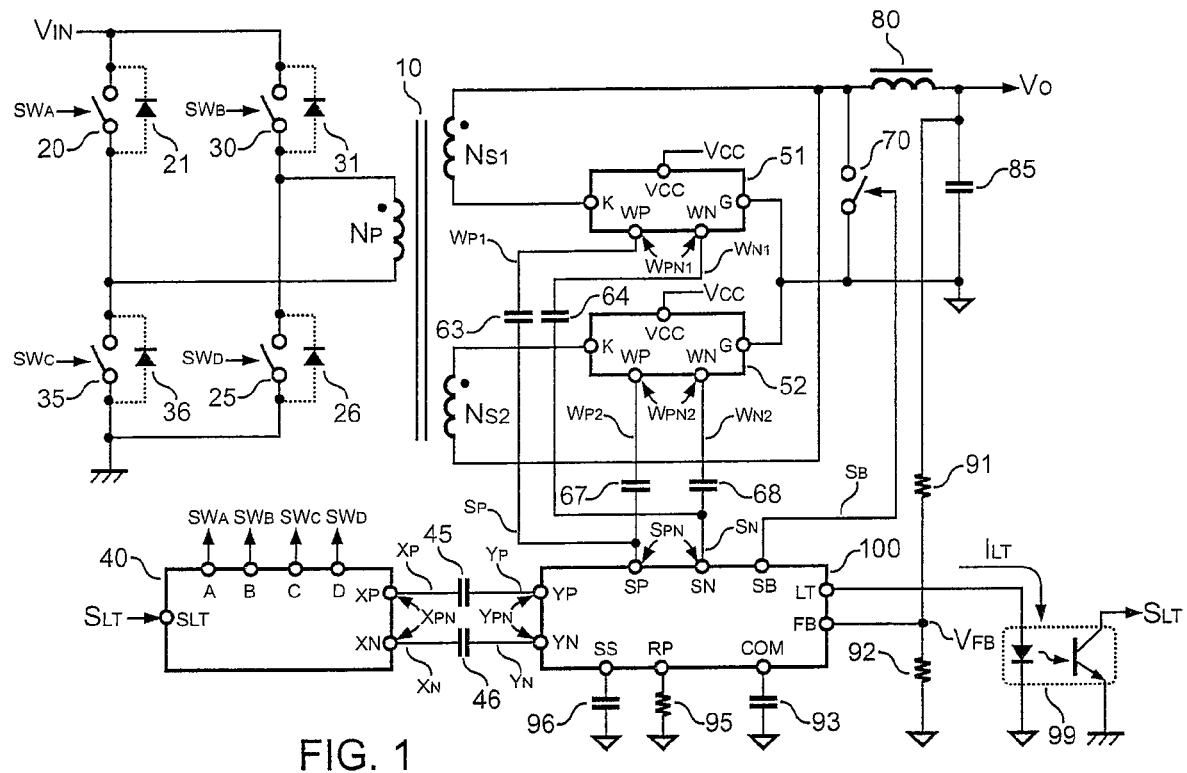
FIG. 1 is an embodiment of a power converter having a synchronous regulation circuit according to the present invention.

FIG. 1 shows an embodiment of a power converter having a synchronous regulation circuit. The power converter comprises a transformer 10 having a primary side and a secondary side. At the primary side of the transformer 10, a primary winding $N_P$ of the transformer 10 is coupled to power switches 20, 25, 30 and 35 for switching the transformer 10. The power switches 20, 30 are coupled to an input voltage $V_{IN}$. The power switches 25, 35 are coupled to an input ground. A primary-side switching circuit 40 generates switching signals $SW_A$, $SW_B$, $SW_C$ and $SW_D$ respectively via terminals A, B, C and D. The primary-side switching circuit 40 further generates synchronous signals $X_P$, and $X_N$. Switching signals $SW_A$, $SW_B$, $SW_C$ and $SW_D$ are coupled to switch the primary winding $N_P$ of the transformer 10. The transformer 10 further has a first secondary winding $N_{S1}$ and a second secondary winding $N_{S2}$ at its secondary side. Switching voltages are produced across the windings $N_{S1}$ and $N_{S2}$ as the transformer 10 is switched.

A first synchronous switch 51 has a rectifying terminal K connected to the first secondary winding $N_{S1}$. A regulating terminal G of the first synchronous switch 51 is connected to a ground reference of an output of the power converter. A power source $V_{CC}$ is coupled to the first synchronous switch 51. A rectifying terminal K of a second synchronous switch 52 is connected to the second secondary winding $N_{S2}$. A regulating terminal G of the second synchronous switch 52 is also connected to the around reference of the output of the power converter. The power source $V_{CC}$ is coupled to the second synchronous switch 52.

Each synchronous switch (51 or 52) comprises a power-switch set and a control circuit. The power-switch set is coupled in between the rectifying terminal K and the regulating terminal G. The control circuits of the synchronous switches 51 and 52 are operated to respectively receive pulse signals $W_{PN1}$ and $W_{PN2}$ from a pulse signal $S_{PN}$. The pulse signal $S_{PN}$ is obtained across terminals SP and SN of the secondary-side switching circuit 100. The pulse signal $W_{PN1}$ is obtained across terminals WP and WN of the synchronous switch 51 and the pulse signal $W_{PN2}$ is obtained across terminals WP and WN of the synchronous switch 52 for turning on/off the power-switch set.

The first synchronous switch 51 is coupled to a secondary-side switching circuit 100 via capacitors 63 and 64 to respectively receive pulse signals $S_P$ and $S_N$ and generate pulse signals $W_{P1}$ and $W_{N1}$. The second synchronous switch 52 is also coupled to the secondary-side switching circuit 100 via capacitors 67 and 68. The secondary-side switching circuit 100 is coupled to the output of the power converter to respectively generate the pulse signals $S_P$ and $S_N$ in response to synchronous signals $Y_P$ and $Y_N$ and a feedback signal $V_{FB}$. The feedback signal $V_{FB}$ is obtained at a joint of voltage divider formed by a resistor 91 and a resistor 92. Therefore, the feedback signal $V_{FB}$ is correlated to an output voltage $V_O$ of the power converter. An output capacitor 85 is coupled to the output of the power converter and the ground reference. Synchronous signals $Y_P$ and $Y_N$ are respectively received via isolation devices, such as capacitors 45 and 46, from synchronous signals $X_P$ and $X_N$. Capacitors 45 and 46 are coupled to the primary-side switching circuit 40 for transferring synchronous signals $X_P$ and $X_N$ and respectively generating synchronous signals $Y_P$ and $Y_N$ for the secondary-side switching circuit 100. Pulse signals $S_P$ and $S_N$ are thus generated for rectifying and regulating the power converter. The polarity of the pulse signals $S_P$ and $S_N$ determines the on/off state of the power-switch set.

An inductor 80 is coupled from the first secondary winding $N_{S1}$ and the second secondary winding $N_{S2}$ to the output of the power converter. A flyback switch 70 is respectively coupled to synchronous switches 51 and 52 via secondary windings $N_{S1}$ and $N_{S2}$. The flyback switch 70 is further connected to the ground reference of the output of the power converter to freewheel the switching current of the inductor 80. The flyback switch 70 is also coupled to the power-switch set and the output of the power converter. The secondary switching circuit 100 generates a driving signal $S_B$ to control the flyback switch 70. The flyback switch 70 is turned on in response to the off state of the power-switch set. The on time of the flyback switch 70 is programmable and correlated to the on time of the power-switch set.

Furthermore, the secondary-side switching circuit 100 generates a light-load signal $I_{LT}$ coupled to an input stage of an optical coupler 99. An output stage of the optical coupler 99 generates an on/off signal $S_{LT}$ coupled to the primary-side switching circuit 40 to disable switching signals $SW_A$, $SW_B$ and synchronous signals $X_P$ and $X_N$ during light load conditions of the power converter in response to the light-load signal $I_{LT}$. The light-load signal $I_{LT}$ is used for saving power and the regulation of output voltage $V_O$. A capacitor 93 is connected to a terminal COM of the secondary-side switching circuit 100 for the loop compensation. A capacitor 96 is connected to a terminal SS of the secondary-side switching circuit 100 for the soft-start operation. A resistor 95 is connected to a programming terminal RP of the secondary-side switching circuit 100 to program the on time of the flyback switch 70.

Figure 2:
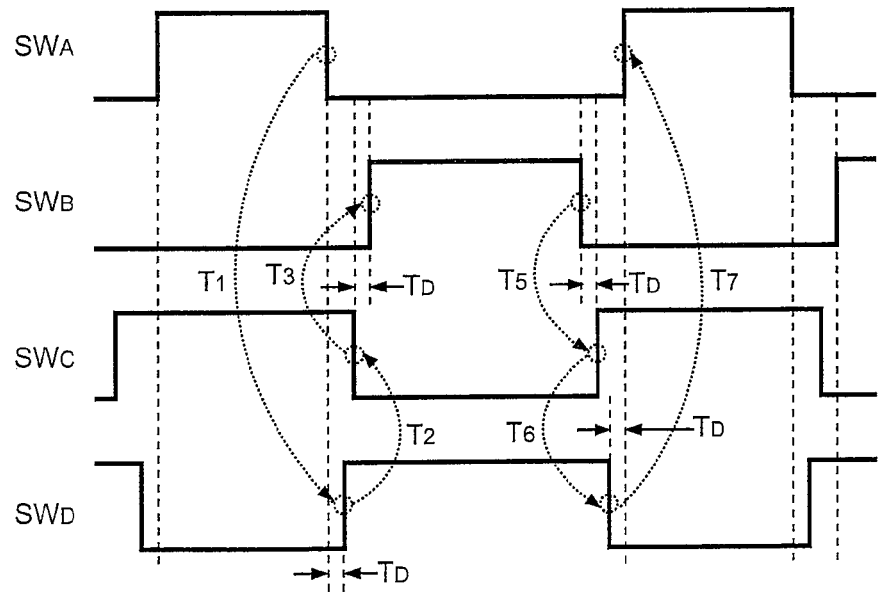
FIG. 2 shows switching signal waveforms according to the present invention.

FIG. 2 shows waveforms of switching signals $SW_A$, $SW_B$, $SW_C$ and $SW_D$. Referring to FIG. 1 and FIG. 2, $T_1$ stage represents that a delay time $T_D$ is inserted after the switching signal $SW_A$ is turned off and before the switching signal $SW_D$ is turned on. A circular current produced by a leakage inductance $L_{PL}$ of the primary winding $N_P$ of the transformer 10 will turn on a diode 36, which achieves a soft-switching operation for the power switch 35. The leakage inductance $L_{PL}$ and the parasitic capacitance $C_J$ of power switches 20, 30, 35, 25 form a resonant tank. Its resonant frequency can be expressed by the following equation:

$$F_R = \frac{1}{2\pi\sqrt{L_{PL} \times C_J}} \qquad (1)$$

The delay time $T_D$ to achieve the phase shift for soft-switching operation is given by, $$T_D = 1/(4 \times F_R) \qquad (2)$$

The switching signal $SW_C$ is turned off at the end of $T_2$ stage. $T_3$ stage represents that the delay time $T_D$ is inserted before the switching signal $SW_C$ is turned off and before the switching signal $SW_B$ is turned on. Therefore, the soft-switching operation of the power switch 30 can be achieved after the diode 31 is turned on. $T_5$ stage represents that the delay time $T_D$ is inserted before the switching signal $SW_B$ is turned off and before the switching signal $SW_C$ is turned on. The circular current will turn on a diode 26 before switching on the power switch 25. The switching signal $SW_D$ is turned off at $T_6$ stage. The switching signal $SW_A$ is turned on after a delay time $T_D$. Therefore the soft-switching operation of the power switch 20 can be achieved after the diode 21 is on ($T_7$ stage).

Figure 3:
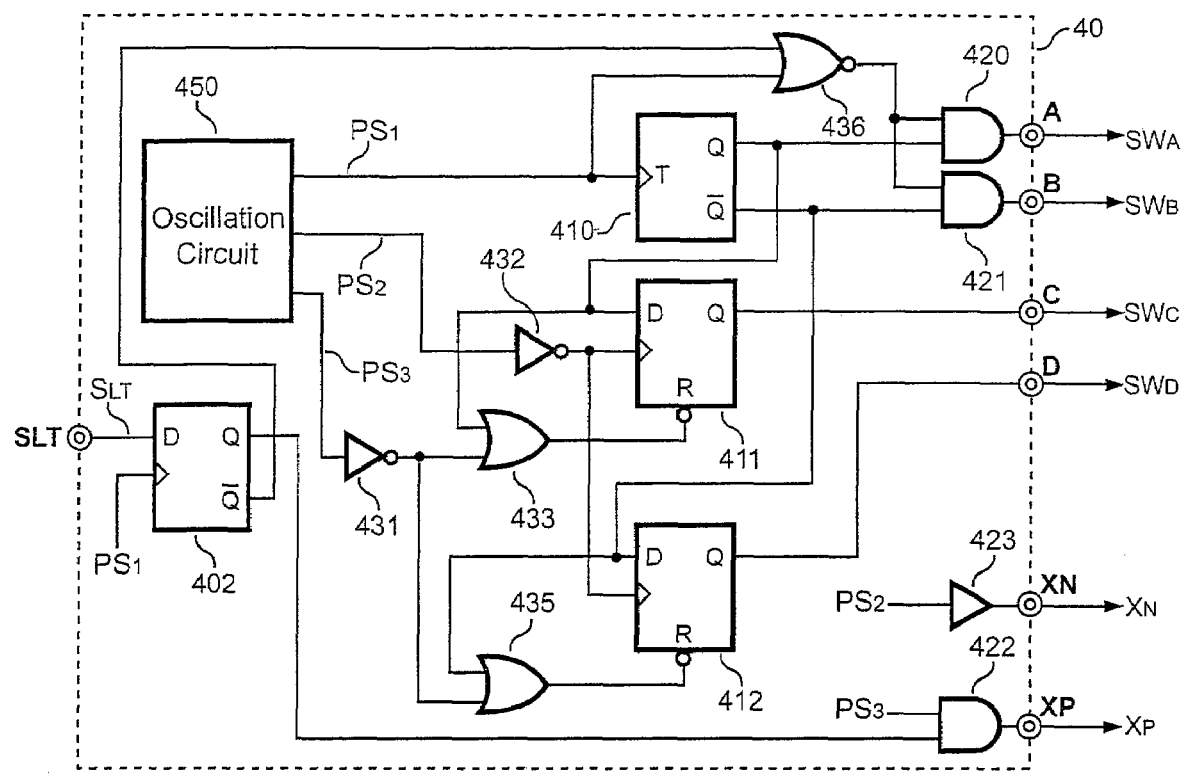
FIG. 3 shows an embodiment of a primary-side switching circuit according to the present invention.

FIG. 3 shows an embodiment of the primary-side switching circuit 40 according to the present invention. An oscillation circuit 450 generates oscillation signals $PS_1$, $PS_2$ and $PS_3$. The oscillation signal $PS_1$ is coupled to a T-flip-flop 410 for performing divide-by-two function. The outputs Q and /Q of the T-flip-flop 410 are respectively connected to AND gates 420 and 421 to generate the switching signal $SW_A$ at a terminal A and the switching signal $SW_B$ at a terminal B. Another inputs of AND gates 420 and 421 are coupled to the oscillation signal $PS_1$ via a NOR gate 436. An output terminal of the NOR gate 436 is coupled to the input terminals of the AND gates 420 and 421. An input terminal of the NOR gate 436 receives the oscillation signal $PS_1$. The oscillation signal $PS_1$ limits a maximum on-time of switching signals $SW_A$ and $SW_B$. The oscillation signal $PS_2$ is coupled to enable D-flipflops 411 and 412 via an inverter 432. The D-input of D-flip-flops 411 and 412 are respectively connected to the outputs Q and /Q of the T-flip-flop 410.

The output of the D-flip-flop 411 generates the switching signal $SW_C$ at a terminal C. The output of the D-flip-flop 412 produces the switching signal $SW_D$ at a terminal D. The oscillation signal $PS_3$ is coupled to reset the D-flip-flop 411 via an inverter 431 and an OR gate 433. An input of the OR gate 433 is controlled by the output Q of the T-flip-flop 410. The oscillation signal $PS_3$ is further coupled to reset the D-flip-flop 412 via the inverter 431 and an OR gate 435. An input of the OR gate 435 is connected to the output /Q of the T-flip-flop 410. A D-flip-flop 402 is coupled to synchronize the on/off signal $S_{LT}$ with the oscillation signal $PS_1$. An output /Q of the D-flip-flop 402 is coupled to an input of the NOR gate 436 to disable switching signals $SW_A$ and $SW_B$ in response to a logic-low of the on/off signal $S_{LT}$. The output Q of the D-flip-flop 402 is coupled to disable the synchronous signals $X_P$ via an input of an AND gate 422. Another input of the AND gate of 422 is coupled to the oscillation signal $PS_3$. An input of a buffer 423 is coupled to the oscillation signal $PS_2$. Therefore, oscillation signals $PS_2$ and $PS_3$ are respectively coupled to generate synchronous signals $X_N$ and $X_P$ through the buffer 423 and the AND gate 422.

Figure 4:
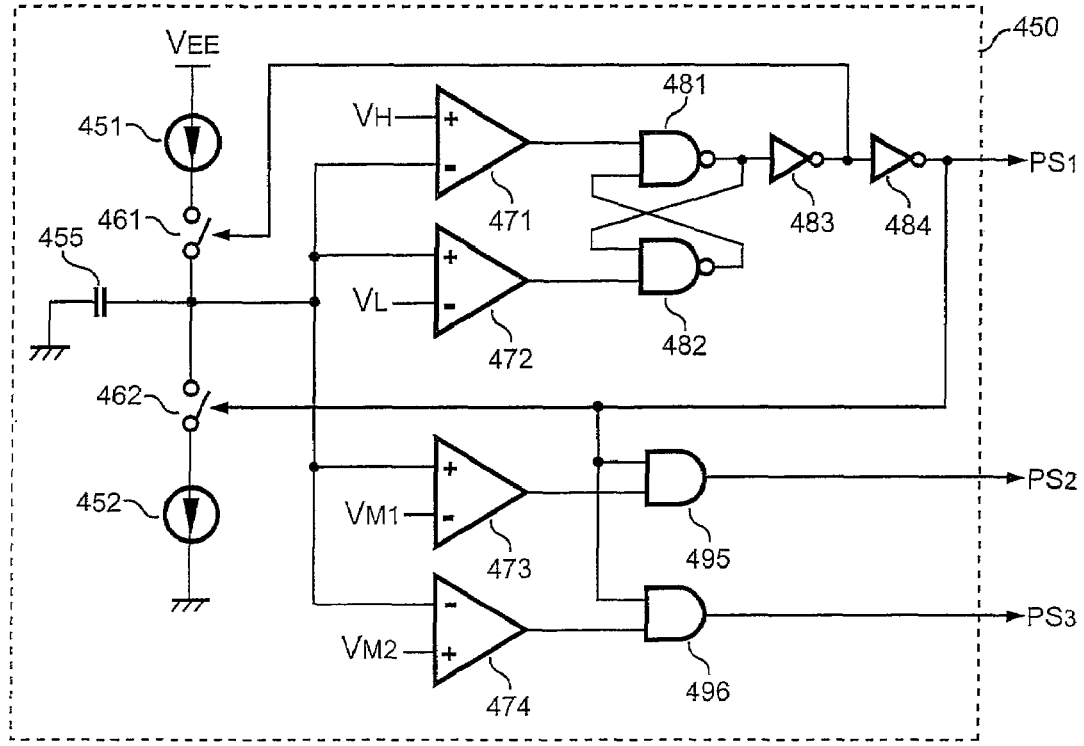
FIG. 4 shows an embodiment of an oscillation circuit of the primary-side switching circuit according to the present invention.

FIG. 4 shows an embodiment of the oscillation circuit 450 according to the present invention. It generates oscillation signals $PS_1$, $PS_2$ and $PS_3$. A current source 451 is coupled to charge a capacitor 455 via a switch 461. Another current source 452 is coupled to discharge the capacitor 455 via a switch 462. A saw-tooth signal is thus generated across the capacitor 455. The capacitor 455 is further connected to comparators 471, 472, 473 and 474. Comparators 471, 472, 473 and 474 have threshold voltages $V_H$, $V_L$, $V_{M1}$ and $V_{M2}$ respectively. NAND gates 481 and 482 develop a SR-latch coupled to the outputs of comparators 471 and 472. The output of the NAND gate 481 generates a charge signal via an inverter 483. The charge signal is coupled to control the switch 461. An output of the inverter 483 is connected to an inverter 484 to generate the oscillation signal $PS_1$. The oscillation signal $PS_1$ is also coupled to control the switch 462, an AND gate 495 and an AND gate 496. An input of the AND gate 495 is connected to an output of the comparator 473 for generating the oscillation signal $PS_2$. Furthermore, an input of the AND gate 496 is connected to an output of the comparator 474 for generating the oscillation signal $PS_3$.

Figure 5:
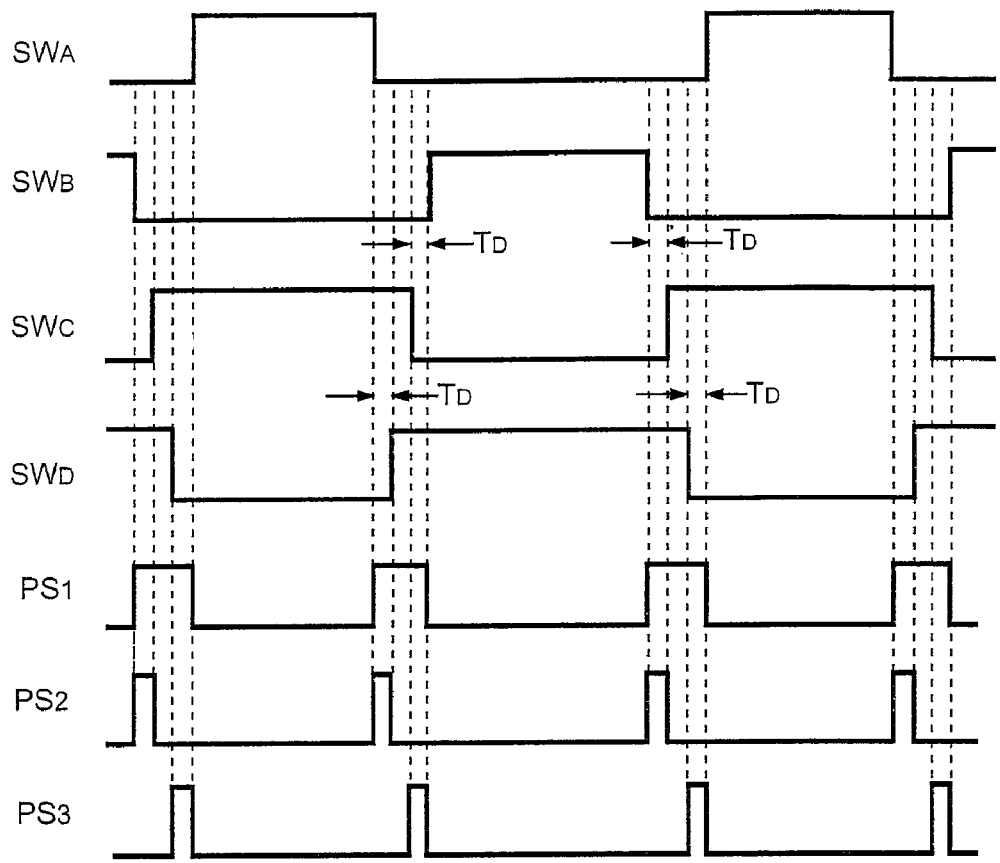
FIG. 5 shows waveforms of the switching signal and an oscillation signal.

FIG. 5 shows the waveforms of switching signals $SW_A$, $SW_B$, $SW_C$ and $SW_D$, and oscillation signals $PS_1$, $PS_2$, and $PS_3$. The oscillation signal $PS_1$ is a short-pulse signal that provides the dead time for switching signals $SW_A$ and $SW_B$. The oscillation signal $PS_2$ is generated once the oscillation signal $PS_1$ is enabled. The oscillation signal $PS_3$ is generated after the oscillation signal $PS_2$ is disabled. The oscillation signal $PS_3$ is disabled once the oscillation signal $PS_1$ is disabled.

Figure 6:
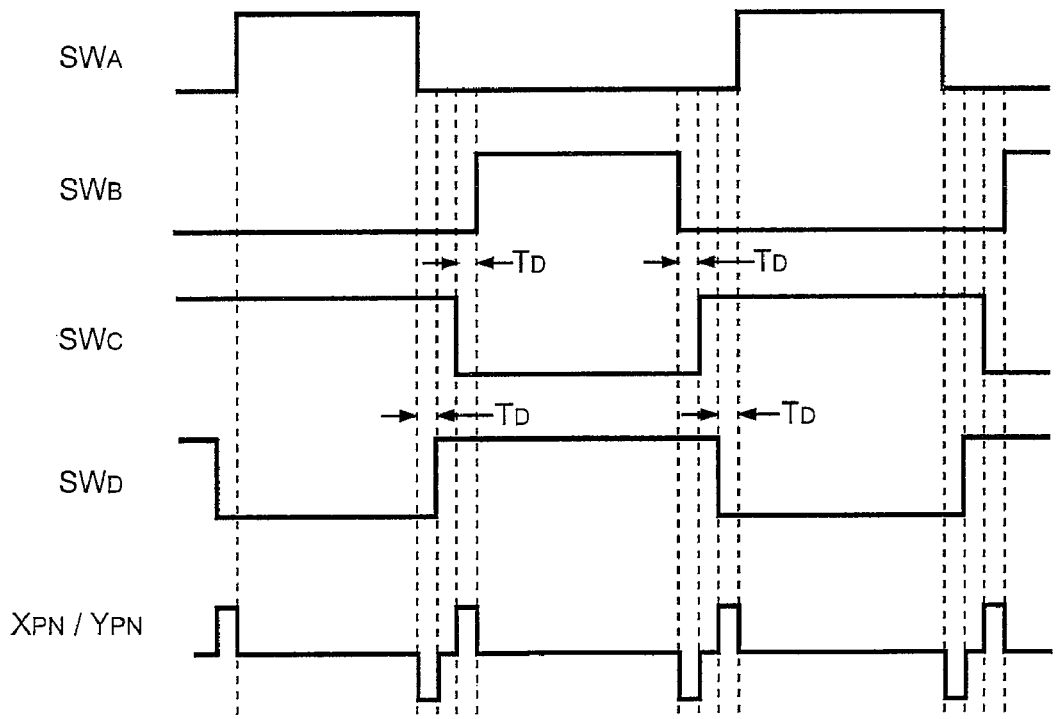
FIG. 6 shows waveforms of the switching signal and synchronous signals.

FIG. 6 shows the waveforms of switching signals $SW_A$, $SW_B$, $SW_C$ and $SW_D$, and synchronous signals $X_{PN}$ (obtained across terminals XP and XN of the primary-side switching circuit 40) and $Y_{PN}$ (obtained across terminals YP and YN of the secondary-side switching circuit 100). A negative-polarity pulse of synchronous signals $X_{PN}$ and $Y_{PN}$ is generated once the switching signals $SW_A$ and $SW_B$ are disabled. A positive-polarity pulse of synchronous signals $X_{PN}$ and $Y_{PN}$ is generated before switching signals $SW_A$ and $SW_B$ are enabled. The pulse width of synchronous signals $X_{PN}$ and $Y_{PN}$ are correlated to the delay time $T_D$ inserted between switching signals $SW_A$, $SW_B$, $SW_C$ and $SW_D$. The delay time $T_D$ is thus inserted between switching signals $SW_A$, $SW_B$, $SW_C$ and $SW_D$, and synchronous signals $X_{PN}$ and $Y_{PN}$.

Figure 7:
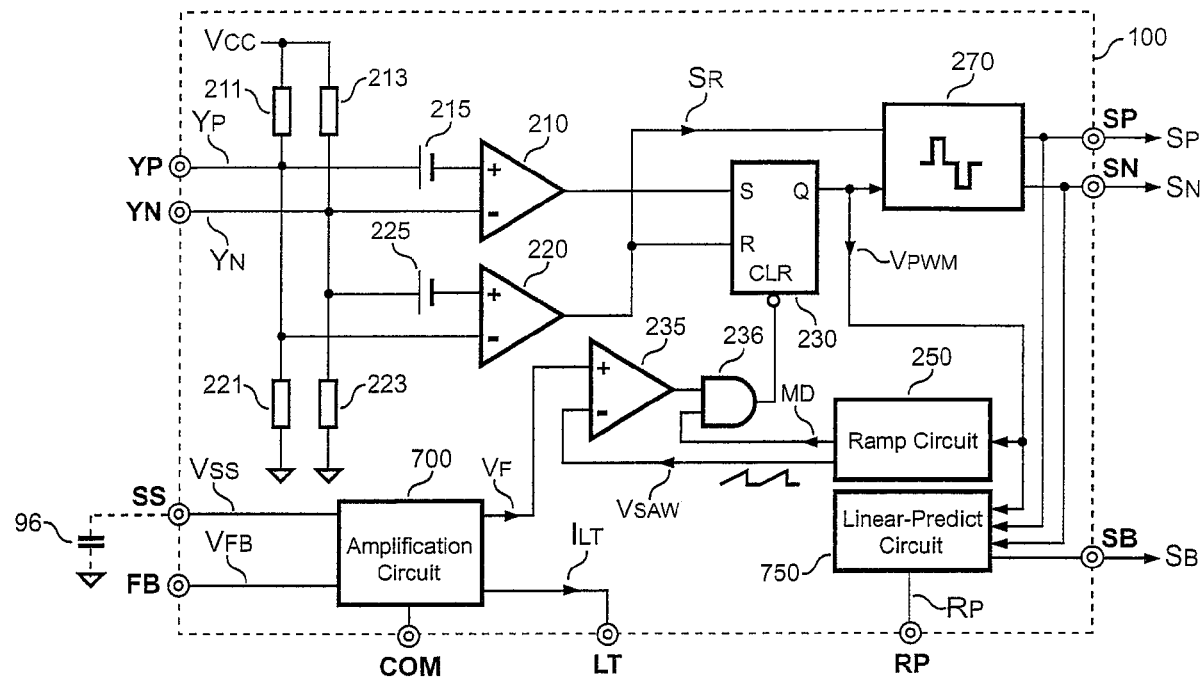
FIG. 7 shows an embodiment of a secondary-side switching circuit according to the present invention.

FIG. 7 shows an embodiment of the secondary-side switching circuit 100 according to the present invention. Resistors 211, 221 and resistors 213, 223 provide bias termination for receiving the synchronous signals $Y_P$ and $Y_N$. Synchronous signals $Y_P$ and $Y_N$ are coupled to comparators 210 and 220, respectively. Comparators 210 and 220 have offset voltages 215 and 225 respectively, which produces hysteresis for the comparison. The outputs of comparators 210 and 220 are respectively coupled to an input S and an input R of a SR-flip-flop 230. The SR-flip-flop 230, an AND gate 236 and a comparator 235 form a PWM circuit for generating a PWM signal $V_{PWM}$ at an output of the SR-flip-flop 230 in response to synchronous signals $Y_P$ and $Y_N$. A clear input CLR of the SR-flip-flop 230 is connected to an output of the AND gate 236. An input of the AND gate 236 is controlled by the comparator 235. An amplification circuit 700 includes an error amplifier, a soft-start circuit and a power management circuit. The power management circuit generates the light-load signal $I_{LT}$ coupled to the primary-side switching circuit 40 to disable switching signals $SW_A$ and $SW_B$ during light load conditions of the power converter. The error amplifier and the soft-start circuit generate an error signal $V_F$ in response to the feedback signal $V_{FB}$ and a soft-start signal $V_{SS}$. A ramp circuit 250 produces a ramp signal $V_{SAW}$ and a maximum duty signal MD in response to the PWM signal $V_{PWM}$. The error signal $V_F$ and the ramp signal $V_{SAW}$ are compared by the comparator 235. The output of the comparator 235 and the maximum duty signal MD are coupled to the AND gate 236 to generate a clear signal to the clear input CLR of the SR-flip-flop 230 for disabling the PWM signal $V_{PWM}$.

A pulse-signal generator 270 is used to generate pulse signals $S_P$ and $S_N$ in accordance with the PWM signal $V_{PWM}$ and a signal $S_R$. The signal $S_R$ is an output of the comparator 220. Therefore, the PWM signal $V_{PWM}$ is enabled in response to synchronous signals $Y_P$ and $Y_N$. The PWM signal $V_{PWM}$ is disabled in response to synchronous signals $Y_P$ and $Y_N$ and the clear signal. The soft-start signal $V_{SS}$ is coupled to control the pulse width of the PWM signal $V_{PWM}$. Pulse signals $S_P$ and $S_N$ are differential signals. The polarity of pulse signals $S_P$ or $S_N$ is determined by the PWM signal $V_{PWM}$. Furthermore, a linear-predict circuit 750 is used for generating the driving signal $S_B$ to control the flyback switch 70 in response to a programming signal $R_P$ and synchronous signals $Y_P$ and $Y_N$. A programming device, such as the resistor 95 is applied to generate the programming signal $R_P$.

Figure 8:
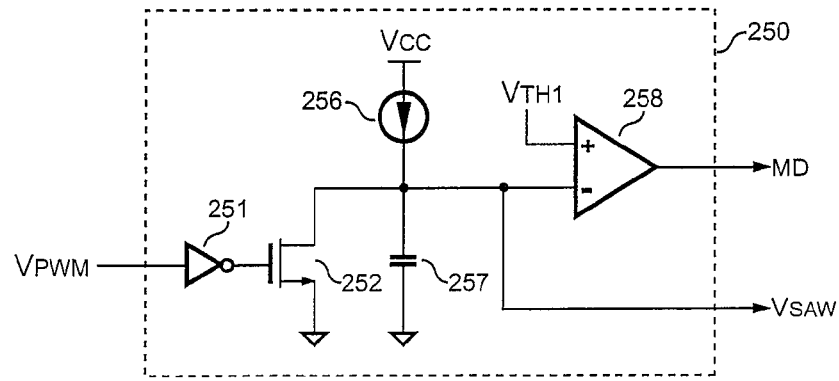
FIG. 8 shows an embodiment of a ramp circuit according to the present invention.

FIG. 8 shows an embodiment of the ramp circuit 250 according to the present invention. A current source 256 is utilized to charge a capacitor 257 as the PWM signal $V_{PWM}$ is enabled. The PWM signal $V_{PWM}$ is connected to discharge the capacitor 257 via an inverter 251 and a transistor 252 when the PWM signal $V_{PWM}$ is disabled. The ramp signal $V_{SAW}$ is thus generated across the capacitor 257. A threshold voltage $V_{TH1}$ is connected to an input of a comparator 258. Another input of the comparator 258 is coupled to the ramp signal $V_{SAW}$. An output of the comparator 258 will generate the maximum duty signal MD to disable the PWM signal $V_{PWM}$ once the ramp signal $V_{SAW}$ is higher than the threshold voltage $V_{TH1}$. Therefore, the maximum on time of the PWM signal $V_{PWM}$ is limited.

Figure 9:
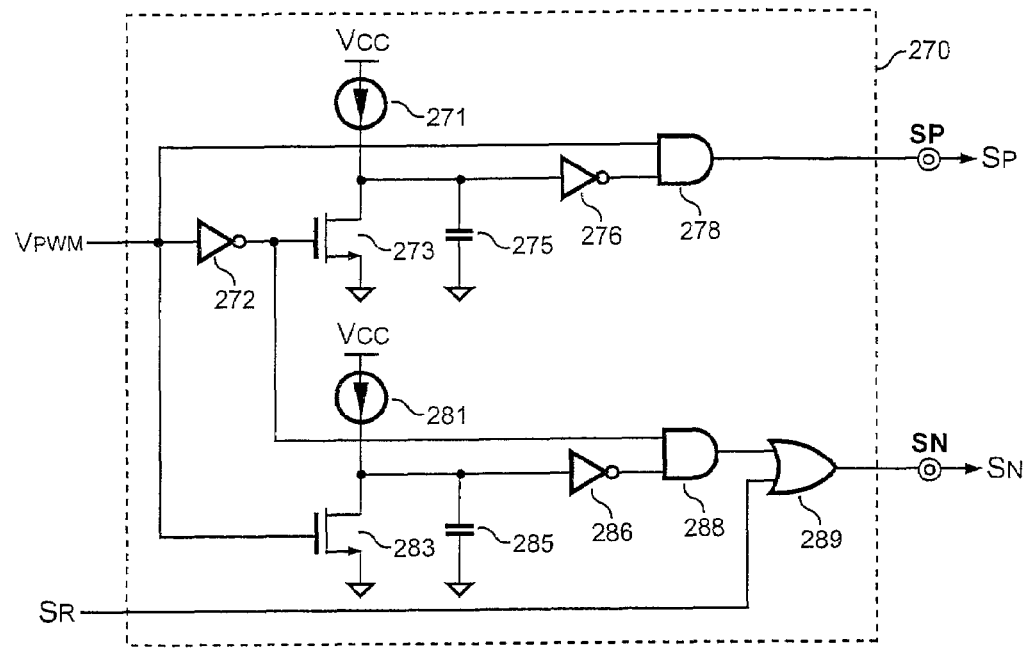
FIG. 9 shows an embodiment of a pulse-signal generator according to the present invention.

FIG. 9 shows an embodiment of the pulse-signal generator 270 according to the present invention. The pulse signals $S_P$ and $S_N$ are differential signals. A positive-polarity pulse signal $S_P$ or $S_N$ is generated in response to the rising edge of the PWM signal $V_{PWM}$. A negative-polarity pulse signal $S_P$ or $S_N$ is generated in response to the falling edge of the PWM signal and the signal $S_R$. Besides, pulse signals $S_P$ and $S_N$ are one-shot signals. The pulse width of pulse signals $S_P$ and $S_N$ are shorter than the pulse width of switching signals $SW_A$, $SW_B$, $SW_C$ and $SW_D$.

A current source 271 is connected to charge a capacitor 275. The PWM signal $V_{PWM}$ is coupled to discharge the capacitor 275 via an inverter 272 and a transistor 273 when the PWM signal $V_{PWM}$ is disabled. The capacitor 275 is connected to an input of an inverter 276. The inputs of an AND gate 278 are respectively connected to an output of the inverter 276 and the PWM signal $V_{PWM}$. A current source 281 is connected to charge a capacitor 285. The PWM signal $V_{PWM}$ is coupled to discharge the capacitor 285 via a transistor 283 when the PWM signal $V_{PWM}$ is enabled. The capacitor 285 is connected to an input of an inverter 286. The inputs of an AND gate 288 are respectively connected to an output of the inverter 286 and an output of the inverter 272. An output of the AND gate 288 and the signal $S_R$ is connected to an OR gate 289. The output of the AND gate 278 and the output of the OR gate 289 respectively generate pulse signals $S_P$ and $S_N$. The pulse width of pulse signals $S_P$ and $S_N$ is determined by the current of current sources 271, 281 and the capacitance of capacitors 275, 285.

Figure 10:
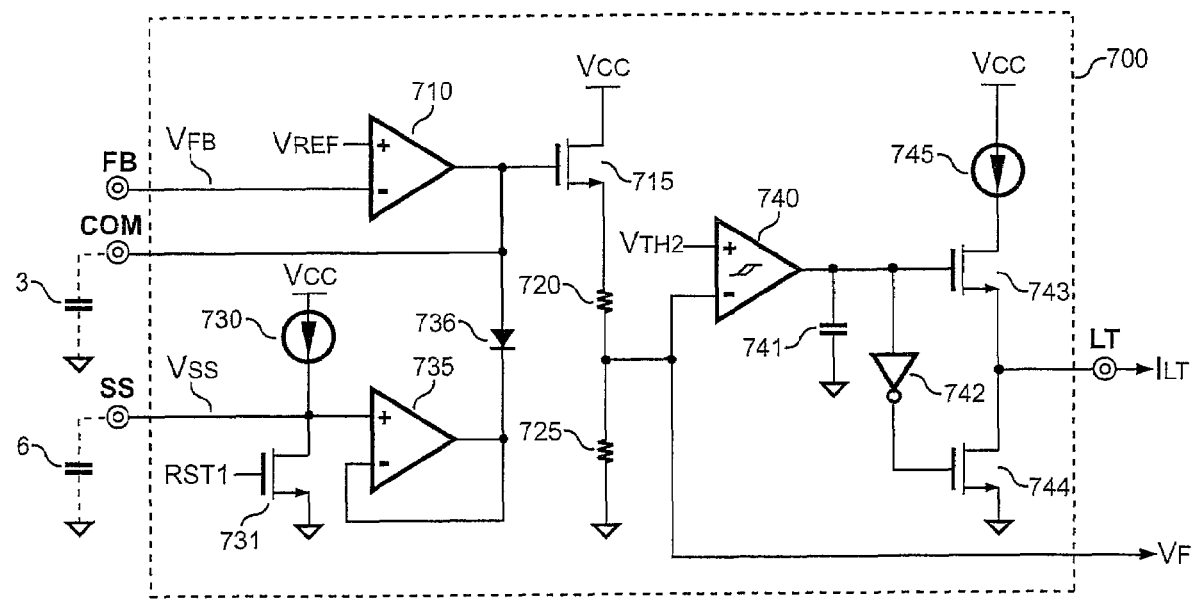
FIG. 10 shows an embodiment of an amplification circuit according to the present invention.

FIG. 10 shows an embodiment of the amplification circuit 700 according to the present invention. The error amplifier includes an operational amplifier 710, a level-shift transistor 715 and resistors 720, 725. The soft-start circuit is developed by a current source 730, a discharge transistor 731, a unit-gain buffer 735 and a diode 736. The power management circuit is formed by a comparator 740, a capacitor 741, an inverter 742, a current source 745 and transistors 743 and 744.

A reference voltage $V_{REF}$ and the feedback signal $V_{FB}$ are coupled to the operational amplifier 710. The operational amplifier 710 is a trans-conductance amplifier. The operational amplifier 710 has an output terminal COM connected to the capacitor 93 (shown in FIG. 1) for the loop compensation. The output terminal COM is further coupled to the unit-gain buffer 735 via the diode 736. An input of the unit-gain buffer 735 is coupled to the soft-start signal $V_{SS}$. The current source 730 associates with the capacitor 96 (shown in FIG. 1) for generating the soft-start signal $V_{SS}$. The discharge transistor 731 is used to discharge the capacitor 96 in response to a system reset signal RST1 of the secondary-side switching circuit 100. Therefore, the soft-start circuit will generate the soft-start signal $V_{SS}$ in response to the system reset signal RST1. The level-shift transistor 715 and resistors 720, 725 provide level shift and attenuation to an output signal of the operational amplifier 710. The error signal $V_F$ is obtained at a joint of the resistors 720 and 725.

A threshold voltage $V_{TH2}$ is coupled to a positive input of the comparator 740. A negative input of the comparator 740 is coupled to receive the error signal $V_F$. A power-management signal will be generated (enabled) at an output of the comparator 740 once the error signal $V_F$ is lower than the threshold voltage $V_{TH2}$. Under light load conditions of the power converter, the power-management signal is enabled. A capacitor 741 is connected to the output of the comparator 740 for providing a debounce operation. As the power-management signal is enabled, the transistor 743 will be turned on and the transistor 744 will be turned off. Thus, the light-load signal $I_{LT}$ will be enabled. The light-load signal $I_{LT}$ is correlated to the current of the current source 745.

Figure 11:
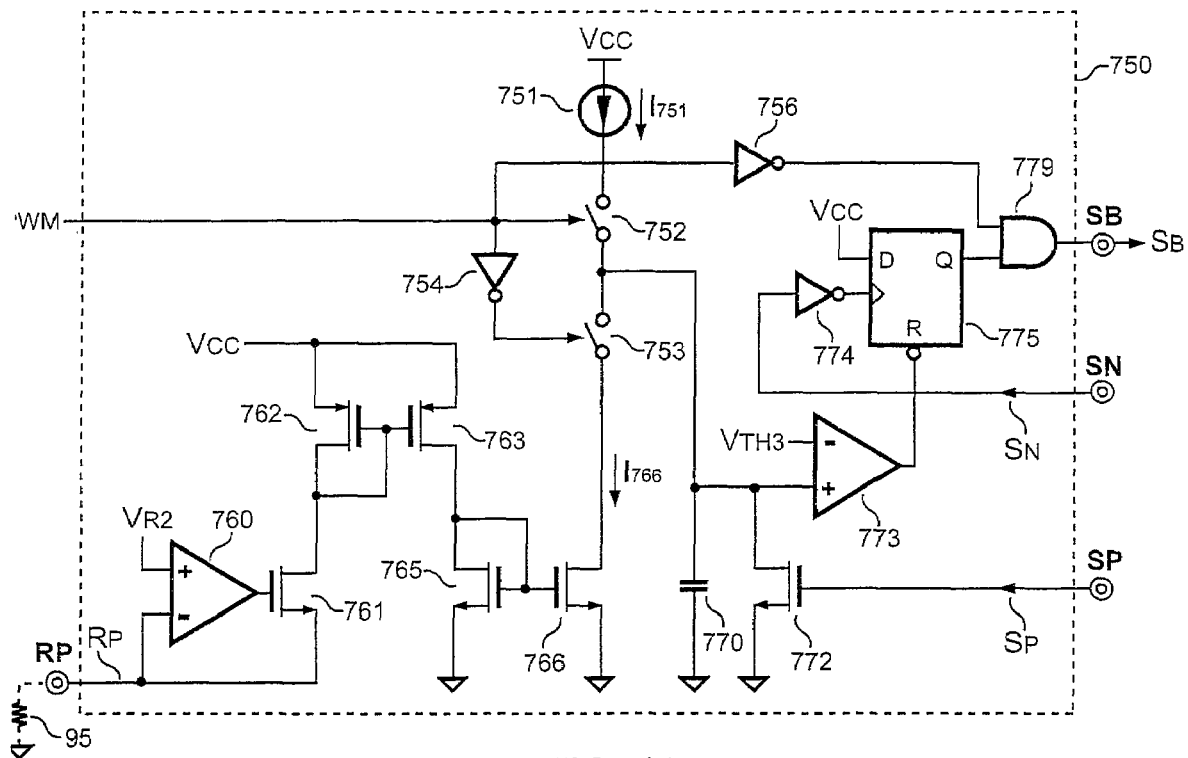
FIG. 11 is an embodiment of a linear-predict circuit according to the present invention.

FIG. 11 shows an embodiment of the linear-predict circuit 750 according to the present invention. The linear-predict circuit 750 is utilized to turn off the flyback switch 70 (shown in FIG. 1) when the power converter is operated under discontinuous current mode. Turning off the flyback switch 70 prevents a reverse current flowing from the output capacitor 85 (shown in FIG. 1) to the flyback switch 70 under discontinuous current mode. A charge current $I_{751}$ supplied by current source 751 is coupled to charge a capacitor 770 via a switch 752. A discharge Current $I_{766}$ is coupled to discharge the capacitor 770 via a switch 753. The PWM signal $V_{PWM}$ is coupled to control the switch 752. The PWM signal $V_{PWM}$ is further coupled to control the switch 753 via an inverter 754. An operational amplifier 760, the resistor 95 (shown in FIG. 1) and transistors 761, 762, 763, 765 and 766 develop a voltage-to-current converter. The operational amplifier 760 is coupled to receive the programming signal $R_P$ for generating the discharge current $I_{766}$ via the transistor 766. The programming signal $R_P$ is generated in accordance with a reference voltage $V_{R2}$ and the resistance of the resistor 95. The capacitor 770 is charged as the PWM signal $V_{PWM}$ is enabled, and is discharged as the PWM signal $V_{PWM}$ is disabled. Additionally, the pulse signal $S_P$ is coupled to discharge the capacitor 770 via a transistor 772. A linear-predict signal is thus generated across the capacitor 770. The pulse signal $S_N$ is coupled to enable a D-flip-flop 775 via an inverter 774. The driving signal $S_B$ is enabled via an AND gate 779 once the PWM signal $V_{PWM}$ is disabled and the D-flip-flop 775 enables its output. A reset-input of the D-flip-flop 775 is connected to an output of a comparator 773. A threshold voltage $V_{TH3}$ is coupled to a negative input of the comparator 773. A positive input of the comparator 773 is connected to the capacitor 770 to receive the linear-predict signal. When the linear-predict signal is lower than the threshold voltage $V_{TH3}$, the comparator 773 will reset the D-flip-flop 775 to disable the driving signal $S_B$. The pulse signals $S_P$ and $S_N$ are generated in response to the PWM signal $V_{PWM}$. As a result, the driving signal $S_B$ is generated in response to the programming signal $R_P$ and the pulse width of the PWM signal $V_{PWM}$.

When the power converter is operated under boundary mode, the magnetized flux $\Phi_C$ of the inductor 80 is equal to its demagnetized flux $\Phi_D$. The boundary mode means the power converter is operated between the continuous current mode and the discontinuous current mode.

The equality is shown as, $$\Phi_C = \Phi_D \tag{3}$$

$$\Phi = B \times Ae = \frac{V \times T}{N} \tag{4}$$

$$\left[\left(V_{IN} \times \frac{N_S}{N_P}\right) - Vo\right] \times T_{CHARGE} = Vo \times T_{DISCHARGE} \tag{5}$$

$$T_{DISCHARGE} = \left\{\left[\left(V_{IN} \times \frac{N_S}{N_P}\right) - Vo\right] / Vo\right\} \times T_{CHARGE} \tag{6}$$

$$T_{DISCHARGE} = k \times T_{CHARGE} \tag{7}$$

Where B is the flux density; Ae is the cross-section area of the inductor 80; $N_S/N_P$ is the turn ratio of the transformer 10; the magnetized time ($T_{CHARGE}$) is the pulse width of the PWM signal $V_{PWM}$; the demagnetized time ($T_{DISCHARGE}$) of the inductor 80 indicates the boundary condition of magnetizing and demagnetizing.

The demagnetized time $T_{DISCHARGE}$ of the inductor 80 can be obtained in accordance with the equation (6). This also shows the demagnetized time $T_{DISCHARGE}$ can be predicted in accordance with the input voltage $V_{IN}$, the output voltage $V_O$ and the magnetized time $T_{CHARGE}$ (the pulse width of the PWM signal $V_{PWM}$). If the input voltage $V_{IN}$ and the output voltage $V_O$ are set as constants, the demagnetized time $T_{DISCHARGE}$ could be predicted as the equation (7) shows, where the value k is programmed by the programming signal $R_P$. Therefore, the on time of the driving signal $S_B$ can be generated in accordance with the demagnetized time $T_{DISCHARGE}$ shown in the equation (7).

Figure 12:
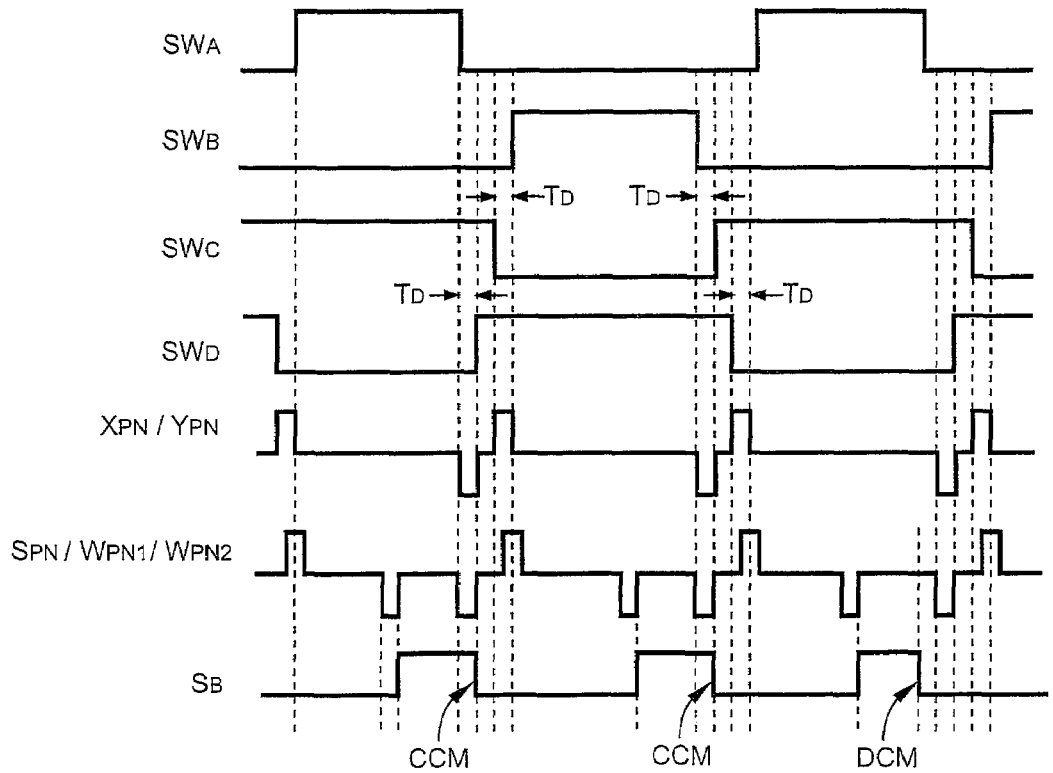
FIG. 12 shows waveforms of soft-switching signals, synchronous signals, pulse signals and a driving signal.

FIG. 12 shows waveforms of switching signals $SW_A$, $SW_B$, $SW_C$ and $SW_D$, synchronous signals $X_{PN}$ (obtained across terminals XP and XN of the primary-side switching circuit 40) and $Y_{PN}$ (obtained across terminals YP and YN of the secondary-side switching circuit 100), pulse signals $S_{PN}$ (obtained across terminals SP and SN of the secondary-side switching circuit 100), $W_{PN1}$ (obtained across terminals WP and WN of the synchronous switch 51) and $W_{PN2}$ (obtained across terminals WP and MN of the synchronous switch 52) and the driving signal $S_B$. The driving signal $S_B$ is disabled before the power converter operated under discontinuous current mode (the inductor 80 is fully demagnetized).

Figure 13:
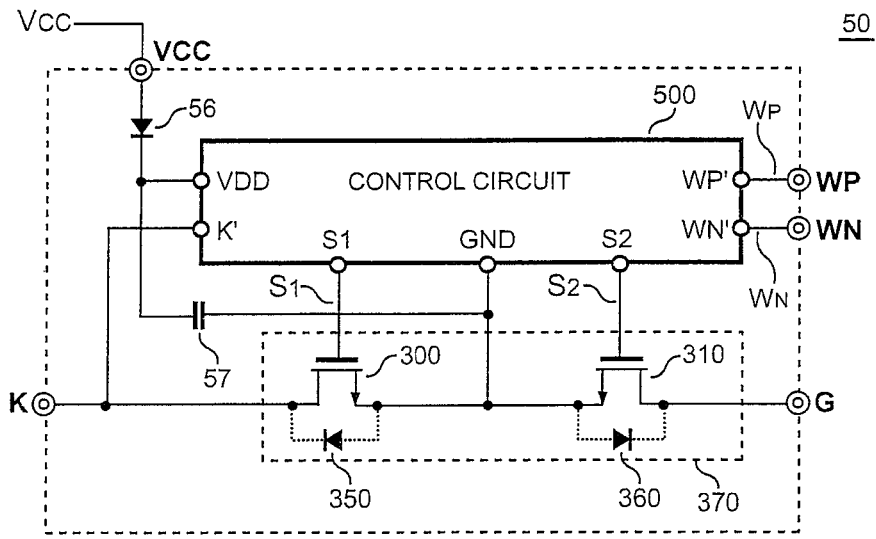
FIG. 13 shows an embodiment of a synchronous switch according to the present invention.

FIG. 13 shows an embodiment of a synchronous switch 50 according to the present invention. It embodies the circuit of synchronous switches 51 and 52. The synchronous switch 50 includes a power-switch set 370, diodes 350, 360, 56, a capacitor 57 and a control circuit 500. The power-switch set 370 comprises power switches 300 and 310. The diode 350 is connected to the power switch 300 in parallel. The diode 360 is connected to the power switch 310 in parallel. Power switches 300 and 310 are connected in series and back-to-back. The power-switch set 370 is connected between the rectifying terminal K and the regulating terminal G. The rectifying terminal K is coupled to the secondary side of the transformer 10. The regulating terminal G is coupled to the output of the power converter. A first input terminal WP' and a second input terminal WN' of the control circuit 500 are respectively coupled to receive pulse signals $W_P$ and $W_N$ for generating gate-driving signals $S_1$ and $S_2$. Gate-driving signals $S_1$ and $S_2$ are coupled to turn on/off the power switches 300 and 310 respectively. The diode 56 and the capacitor 57 form a charge-pump circuit to supply power to the control circuit 500. A power source $V_{CC}$ is connected to charge the capacitor 57 via the diode 56. A terminal VDD and a terminal GND of the control circuit 500 are connected in parallel with the capacitor 57. The terminal GND is further connected to the sources of power switches 300 and 310.

Figure 14:
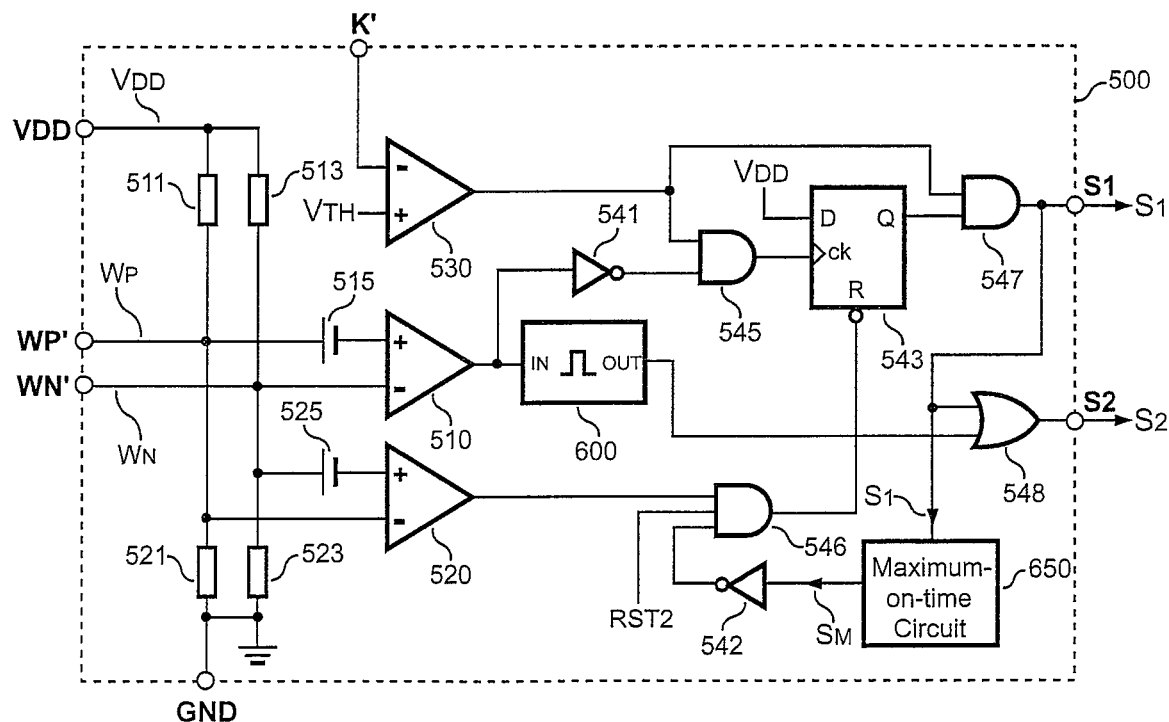
FIG. 14 is an embodiment of a control circuit of the synchronous switch according to the present invention.

FIG. 14 shows an embodiment of the control circuit 500 according to the present invention. Resistors 511, 521, 513 and 523 provide the bias termination for receiving pulse signals $W_P$ and $W_N$. Pulse signals $W_P$ and $W_N$ are coupled to comparators 510 and 520. Comparators 510 and 520 have offset voltages 515 and 525 respectively, which produces hysteresis for the comparison. A threshold voltage $V_{TH}$ is coupled to a positive input of a comparator 530. A negative input of the comparator 530 is coupled to the rectifying terminal K. An output of the comparators 510 is coupled to enable a D-flip-flop 543 via an inverter 541 and an AND gate 545. The D-flip-flop 543 is operated as a latch circuit. An input of the AND gate 545 is connected to an output of the comparator 530. A reset-input of the D-flip-flop 543 is controlled by an output of the comparator 520 via an AND gate 546. An output of the D-flip-flop 543 and the output of the comparator 530 are connected to an AND gate 547. The gate-driving signal $S_1$ is generated at an output of the AND gate 547 for turning on/off the power switch 300. The maximum on time of the gate-driving signal $S_1$ is limited by a maximum-on-time circuit 650. The gate-driving signal $S_1$ is coupled to the maximum-on-time circuit 650. After a blanking time, a maximum-on-time signal $S_M$ will be produced as the gate-driving signal $S_1$ is enabled. The maximum-on-time signal $S_M$ is coupled to the AND gate 546 via an inverter 542. An input of the AND gate 546 is connected to a power-on reset signal RST2. An output of the AND gate 546 is coupled to reset the D-flip-flop 543. The maximum on time of the gate-driving signal $S_1$ is thus limited by the blanking time of the maximum-on-time circuit 650. The gate-driving signal $S_1$ will turn off the power switch 300 once the equation (8) is satisfied as follows, $$V_{WN} - V_{WP} > V_{525} \qquad (8)$$

The gate-driving signal $S_1$ will turn on the power switch 300 when equations (9) and (10) are satisfied, $$V_{WP} - V_{WN} > V_{515} \qquad (9)$$

$$V_K < V_{TH} \qquad (10)$$

Where $V_{WP}$ and $V_{WN}$ is the voltage of pulse signals $W_P$ and $W_N$; $V_K$ is the voltage at the rectifying terminal K; $V_{TH}$ is the voltage of the threshold voltage $V_{TH}$; $V_{515}$ is the value of the offset voltage 515; $V_{525}$ is the value of the offset voltage 525.

The voltage at the rectifying terminal K will be lower than the voltage of the threshold voltage $V_{TH}$ once the diode 350 (as shown in FIG. 13) is conducted. The power switch 300 can only be turned on after the diode 350 is turned on, which synchronizes the switching and the polarity of the transformer 10, and achieves soft-switching operation of the power switch 300. Another gate-driving signal $S_2$ is generated at an output of an OR gate 548 for switching on/off the power switch 310. An input of the OR gate 548 is connected to the gate-driving signal $S_1$. Another input of the OR gate 548 is coupled to an output of a one-shot signal generator 600. An input of the one-shot signal generator 600 is connected to the output of the comparator 510. Therefore, the gate-driving signal $S_2$ is generated in response to pulse signals $W_P$ and $W_N$. In addition, the on/off states of the gate-driving signal $S_2$ correspond to the gate-driving signal $S_1$.

Figure 15:
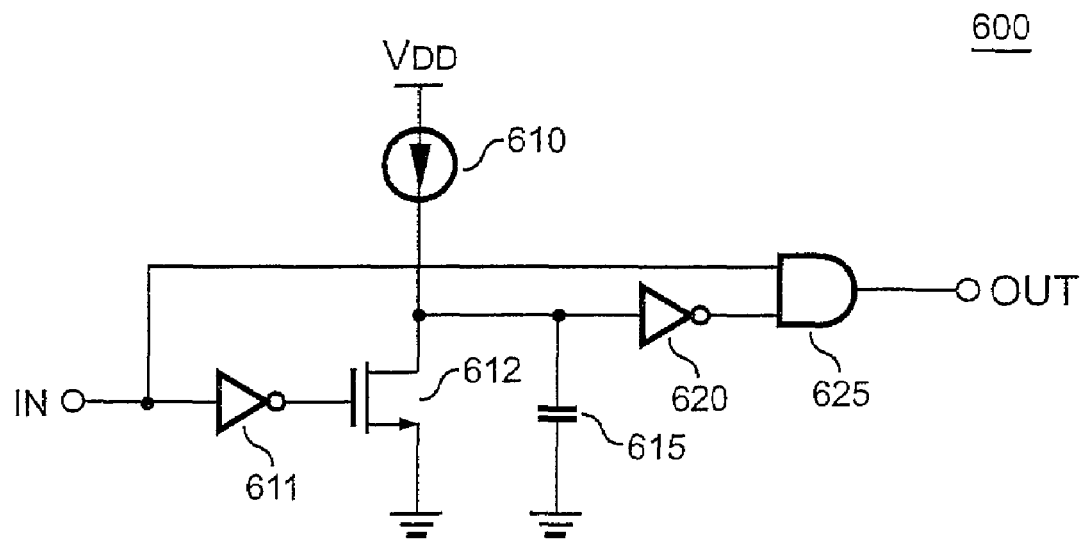
FIG. 15 shows an embodiment of a one-shot signal generator according to the present invention.

FIG. 15 shows an embodiment of the one-shot signal generator 600 according to the present invention. A current source 610 is coupled to charge a capacitor 615. A transistor 612 is coupled to discharge the capacitor 615. An input signal is coupled to control the transistor 612 via an inserter 611. The input signal is further coupled to an input of an AND gate 625. Another input of the AND gate 625 is coupled to the capacitor 615 via an inverter 620. An output of the AND gate 625 generates an output signal of the one-shot signal generator 600. When the input signal becomes logic-low, the capacitor 615 is discharged and the output of the AND gate 625 becomes logic-low. When the input signal becomes logic-high, the current source 610 will start to charge the capacitor 615. The AND gate 625 will output a one-shot signal. A current of the current source 610 and the capacitance of the capacitor 615 determine the pulse width of the one-shot signal.

Figure 16:
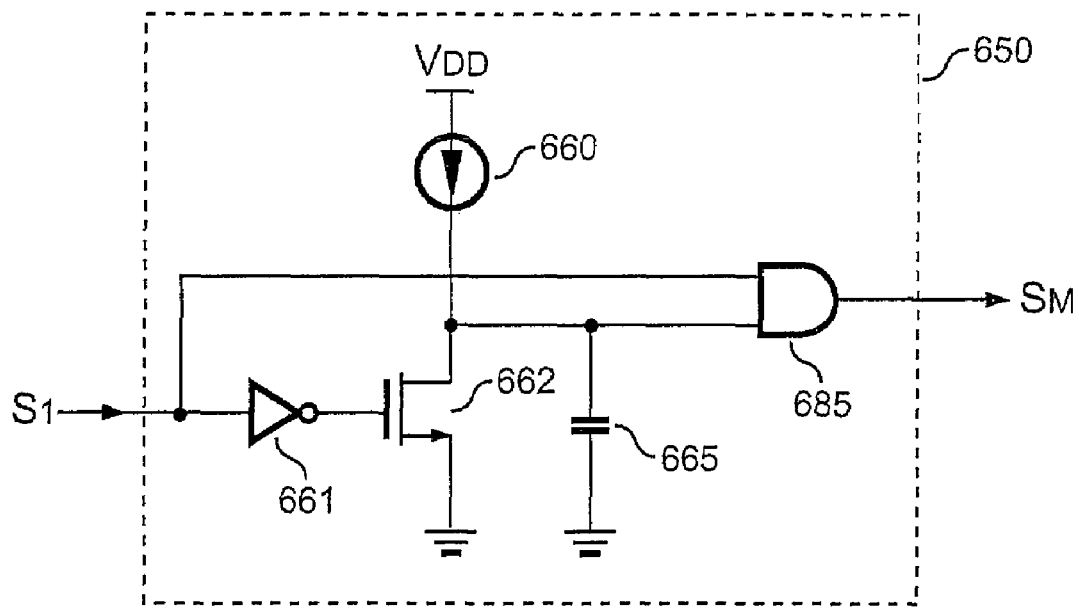
FIG. 16 is an embodiment of a maximum-on-time circuit according to the present invention.

FIG. 16 shows an embodiment of the maximum-on-time circuit 650 according to the present invention. A current source 660 is coupled to charge a capacitor 665. A transistor 662 is coupled to discharge the capacitor 665. The gate-driving signal $S_1$ is coupled to control the transistor 662 via an inverter 661. The gate-driving signal $S_1$ is further connected to an input of an AND gate 685. Another input of the AND gate 685 is coupled to the capacitor 665. Once the gate-driving signal $S_1$ is enabled, an output of the AND gate 685 will generate the maximum-on-time signal $S_M$ to disable the gate-driving signal $S_1$ after the blanking time. The blanking time is determined by the current of the current source 660 and the capacitance of the capacitor 665.

Figure 17:
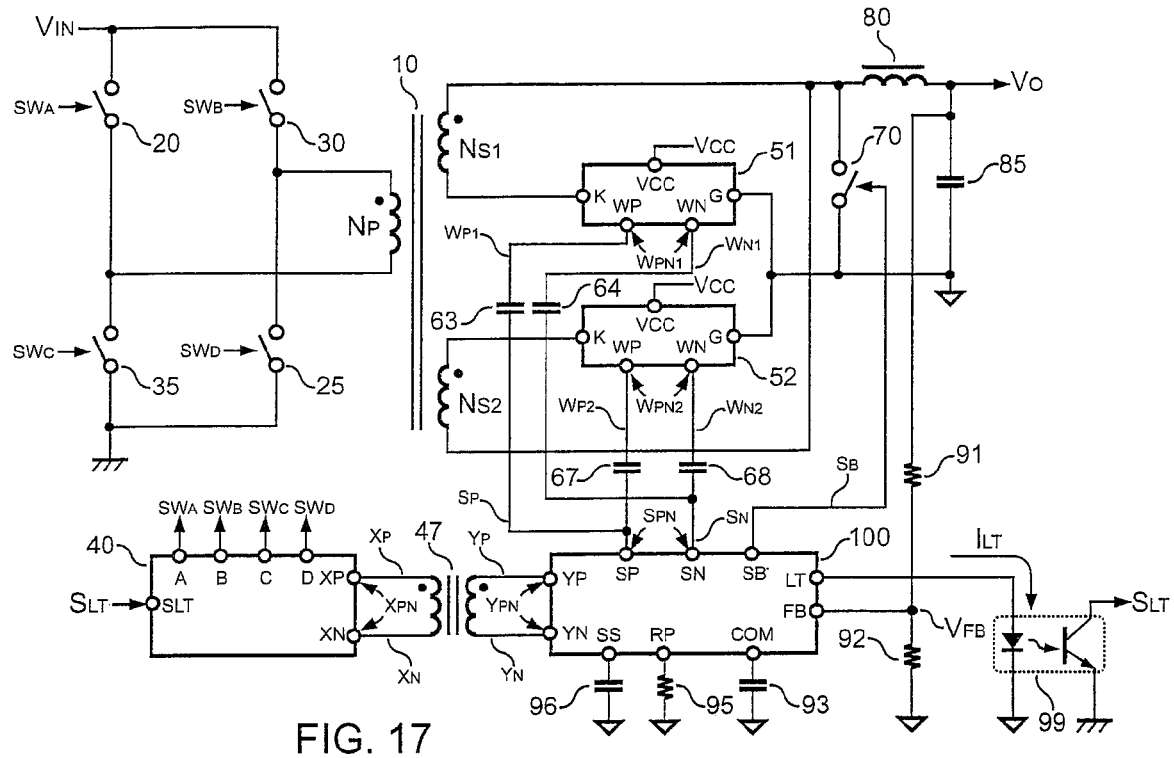
FIG. 17 shows another embodiment of the power converter having the synchronous regulation circuit according to the present invention.

FIG. 17 shows another embodiment of a power converter with synchronous regulation circuit. In this embodiment, a pulse transformer 47 is operated as the isolation device.

Figure 18:
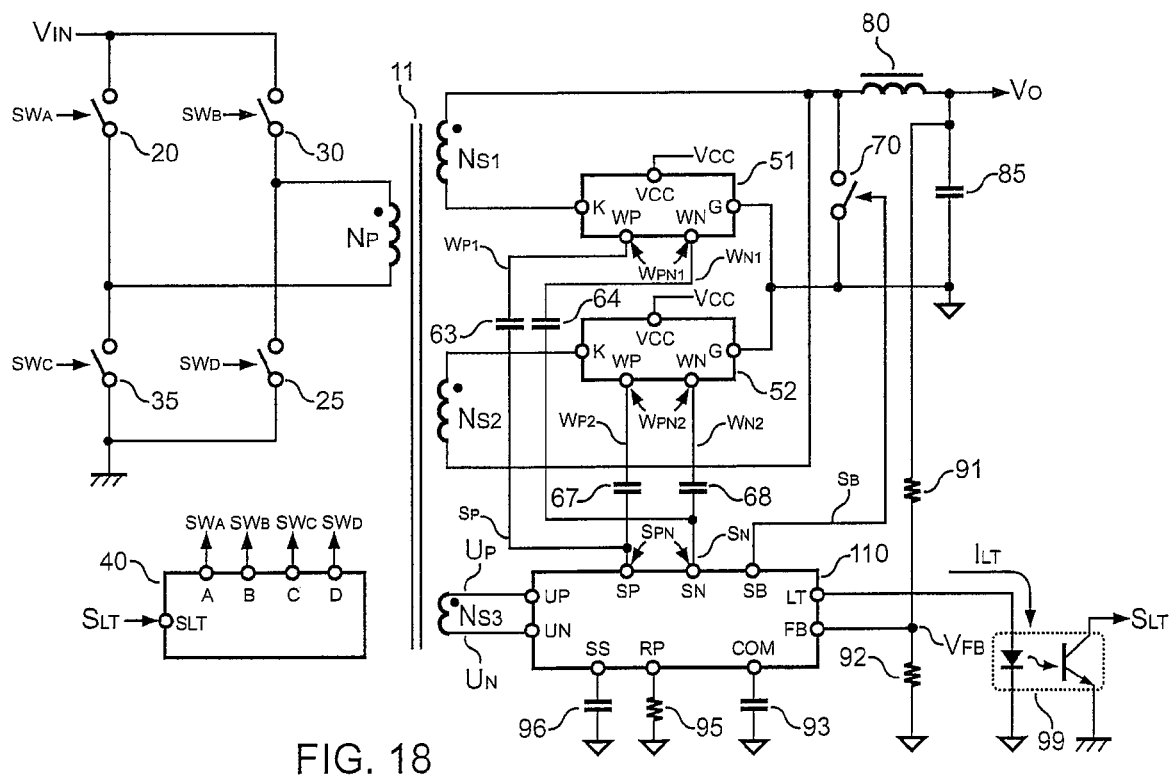
FIG. 18 is another embodiment of the power converter having a synchronous regulation circuit according to the present invention.

FIG. 18 shows another embodiment of a power converter with synchronous regulation circuit. In this embodiment, a secondary-side switching circuit 110 is coupled to a transformer 11 to receive synchronous signals $U_P$ and $U_N$. The transformer 11 has a third secondary winding $N_{S3}$ to generate the synchronous signals $U_P$ and $U_N$ in response to the switching operation of the transformer 11. The synchronous signals $U_P$ and $U_N$ are a differential signals. The voltage level of the synchronous signals $U_P$ and $U_N$ are synchronized with the switching voltage of the transformer 11.

Figure 19:
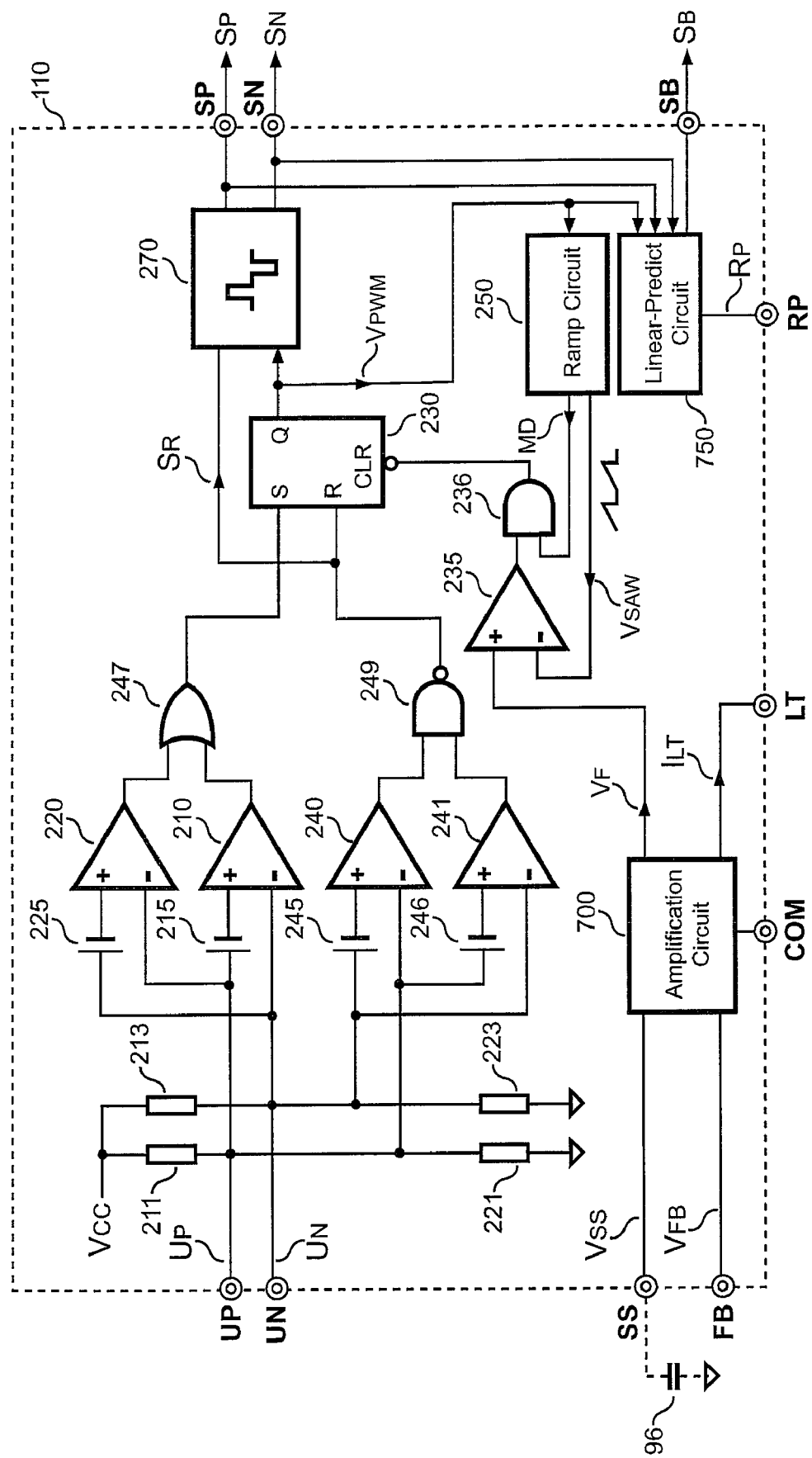
FIG. 19 shows another embodiment of the secondary-side switching circuit for the synchronous regulation circuit in FIG. 18.

FIG. 19 shows an embodiment of the secondary-side switching circuit 110 that is developed for the synchronous regulation circuit shown in FIG. 18. Comparators 210 and 220 having offset voltages 215 and 225 are coupled to receive the synchronous signals $U_P$ and $U_N$. An output of the comparator 210 will become logic-high when the positive voltage level of the synchronous signals $U_P$ and $U_N$ (denoted as $U_P/U_N$) is higher than the offset voltage 215. An output of the comparator 220 will become logic-high when the negative voltage level of the synchronous signals $U_P$ and $U_N$ (denoted as $U_P/U_N$) is higher than the offset voltages 225. The outputs of comparators 210 and 220 are coupled to enable the SR-flip-flop 230 via an OR gate 247. Comparators 240 and 241 having offset voltages 245 and 246 are also coupled to receive the synchronous signals $U_P$ and $U_N$. An output of the comparator 240 will become logic-low when the positive voltage level of the synchronous signals $U_P$ and $U_N$ (denoted as $U_P/U_N$) is lower than the offset voltage 245. An output of the comparator 241 will become logic-low when the negative voltage level of the synchronous signals $U_P$ and $U_N$ (denoted as $U_P/U_N$) is lower than the offset voltages 246. The outputs of comparators 240 and 241 are coupled to disable the SR-flip-flop 230 through an NAND gate 249. The PWM signal $V_{PWM}$ generated by the SR-flip-flop 230 is therefore corresponding to the voltage level of the synchronous signals $U_P$ and $U_N$.

It will be apparent to those skilled in the art that various modifications and variations can be made to the structure of the present invention without departing from the scope or spirit of the invention. In view of the foregoing it is intended that the present invention cover modifications and variations of this invention provided they fall within the scope of the following claims and their equivalents.

What is claimed is:

1. A synchronous regulation circuit for a power converter, comprising:
    a primary-side switching circuit, for generating switching signals and synchronous signals, wherein said switching signals are coupled to switch a transformer;
    an isolation device, coupled to said primary-side switching circuit for transferring said synchronous signals from a primary side of said transformer to a secondary side of said transformer;
    a secondary-side switching circuit, coupled to an output of said power converter to generate pulse signals in response to said synchronous signals and a feedback signal; and
    synchronous switches, each having a power-switch set and a control circuit, said power-switch set being coupled in between said secondary side of said transformer and said output of said power converter; and said control circuit being operated to receive said pulse signals for turning on/off said power-switch set;
    wherein said feedback signal is correlated to said output of said power converter; said pulse signals are generated for rectifying and regulating said power converter; and the polarity of said pulse signals determines the on/off states of said power-switch set.

2. The synchronous regulation circuit as claimed in claim 1, wherein said pulse signals are coupled from said secondary-side switching circuit to said synchronous switches via capacitors.

3. The synchronous regulation circuit as claimed in claim 1, further comprising:
    a flyback switch, coupled to said synchronous switches and said output of said power converter; wherein said flyback switch is turned on in response to the off state of said power-switch set; an on time of said flyback switch is correlated to an on time of said power-switch set.

4. The synchronous regulation circuit as claimed in claim 1, wherein said power-switch set is formed by a first power switch and a second power switch connected in series; said first power switch has a first diode connected in parallel, said second power switch has a second diode connected in parallel; wherein said control circuit generates a first gate-driving signal and a second gate-driving signal; said first gate-driving signal is coupled to control said first power switch, and said second gate-driving signal is coupled to control said second power switch.

5. The synchronous regulation circuit as claimed in claim 4, wherein said first power switch is turned on once said first diode is conducted.

6. The synchronous regulation circuit as claimed in claim 1, wherein said isolation device includes a pulse transformer or capacitors.

7. The synchronous regulation circuit as claimed in claim 1, wherein said primary-side switching circuit generates said synchronous signals in response to said switching signals, wherein a delay time is inserted between said switching signals and said synchronous signals.

8. The synchronous regulation circuit as claimed in claim 1, wherein said secondary-side switching circuit comprises:
    a programming terminal, coupled to a programming device for generating a programming signal; and
    a linear-predict circuit, for generating a driving signal in response to said programming signal and said synchronous signals; wherein said driving signal is utilized to control said flyback switch.

9. The synchronous regulation circuit as claimed in claim 8, wherein said secondary-side switching circuit further comprises:
    a PWM circuit, for generating a PWM signal in response to said synchronous signals;
    an error amplifier, coupled to said output of said power converter to receive said feedback signal and generate an error signal;
    a soft-start circuit, for generating a soft-start signal in response to a reset signal;
    a ramp circuit, for generating a ramp signal in response to said PWM signal;
    a comparator, for generating a clear signal to disable said PWM signal in response to said error signal and said ramp signal; and
    a pulse-signal generator, for generating said pulse signals in response to said PWM signal; wherein said PWM signal is enabled in response to said synchronous signals, said PWM signal is disabled in response to said synchronous signals and said clear signal; said soft-start signal is coupled to control the pulse width of said PWM signal; said pulse signals are differential signals, and the polarity of pulse signals determines the on/off states of said power-switch set.

10. The synchronous regulation circuit as claimed in claim 1, wherein said synchronous switches each comprises:
    a rectifying terminal, coupled to said secondary side of said transformer;
    a regulating terminal, coupled to a ground reference of said output of said power converter;
    a first input terminal; and a second input terminal; wherein said power-switch set is connected in between said rectifying terminal and said regulating terminal; said first input terminal and said second input terminal are coupled to receive said pulse signals for turning on/off said power-switch set.

11. The synchronous regulation circuit as claimed in claim 1, wherein said control circuit comprises a latch circuit coupled to receive said pulse signals for setting or resetting said latch circuit; and said latch circuit is coupled to turn on/off said power-switch set.

12. A synchronous regulator of a power converter, comprising:
a primary-side switching circuit, for generating switching signals to switch a transformer;
a secondary-side switching circuit, coupled to an output of said power converter to generate pulse signals in response to said switching signals and an output voltage of said power converter; and
synchronous switches, each having a power-switch set and a control circuit, said control circuit receiving said pulse signals via capacitors for turning on/off said power-switch set; wherein said power-switch set is coupled in between said transformer and said output of said power converter; and said pulse signals are generated for rectifying and regulating said power converter.

13. The synchronous regulator as claimed in claim 12, further comprising:
a flyback switch, coupled to said synchronous switches and said output of said power converter; wherein said flyback switch is turned on in response to an off state of said power-switch set; and an on time of flyback switch is correlated to an on time of said power-switch set.

14. The synchronous regulator as claimed in claim 12, wherein said power-switch set is formed by a first power switch and a second power switch connected in series; said first power switch has a first diode connected in parallel, and said second power switch has a second diode connected in parallel; wherein said control circuit generates a first gate-driving signal and a second gate-driving signal; said first gate-driving signal is coupled to control said first power switch and said second gate-driving signal is coupled to control said second power switch; and said first power switch turns on once said first diode is conducted.

15. The synchronous regulator as claimed in claim 12, wherein said pulse signals are one-shot signals, and a pulse width of said pulse signals is shorter than a pulse width of said switching signals.

16. The synchronous regulator as claimed in claim 12, wherein said secondary-side switching circuit comprises:
a programming terminal, coupled to a programming device for generating a programming signal; and
a linear-predict circuit, for generating a driving signal in response to said programming signal and said pulse signals; wherein said driving signal is utilized to control said flyback switch.

17. The synchronous regulator as claimed in claim 16, wherein said secondary-side switching circuit further comprises:
a PWM circuit, for generating a PWM signal in response to said switching signals;
an error amplifier, coupled to said output of said power converter to receive a feedback signal for generating an error signal;
a ramp circuit, for generating a ramp signal in response to said PWM signal;
a comparator, for generating a clear signal to disable said PWM signal in response to said error signal and said ramp signal; and
a pulse-signal generator, for generating said pulse signals in response to said PWM signal; wherein said feedback signal is correlated to said output voltage of said power converter; said PWM signal is enabled in response to said switching signals, said PWM signal is disabled in response to said switching signals and said clear signal; said pulse signals are differential signals; and the polarity of said pulse signals determines the on/off states of said power-switch set.

18. The synchronous regulator as claimed in claim 17, wherein said secondary-side switching circuit further comprises a power management circuit coupled to receive said error signal for generating a light-load signal; and said light-load signal is coupled to said primary-side switching circuit to disable said switching signals under light load conditions of said power converter.

19. The synchronous regulator as claimed in claim 12, wherein said synchronous switch each comprises:
a rectifying terminal, coupled to said secondary side of said transformer;
a regulating terminal, coupled to a ground reference of said output of said power converter;
a first input terminal; and
a second input terminal; wherein said power-switch set is connected in between said rectifying terminal and said regulating terminal; and said first input terminal and said second input terminal are coupled to receive said pulse signals for turning on/off said power-switch set.

20. The synchronous regulator as claimed in claim 12, wherein said control circuit comprises a latch circuit coupled to receive said pulse signals for setting or resetting said latch circuit; and said latch circuit is coupled to turn on/off said power-switch set.

21. A method for providing synchronous regulation circuit of a power converter, comprising:
generating switching signals to switch a transformer;
generating pulse signals in response to said switching signals and a feedback signal;
transferring said pulse signals to a latch via capacitors;
setting or resetting said latch in response to the polarity of said pulse signals; and
turning on/off a power-switch set in response to a state of said latch;
wherein said feedback signal is correlated to an output of said power converter; and said power-switch set is coupled in between said transformer and said output of said power converter for rectifying and regulation.

22. The method as claimed in claim 21, further comprising:
receiving a programming signal; and
generating a driving signal to turn on/off a flyback switch in response to said programming signal and said pulse signals; wherein said flyback switch is coupled to said power-switch set and said output of said power converter.

23. The method as claimed in claim 22, further comprising:
generating an error signal in response to said feedback signal; and
generating a light-load signal by comparing said error signal with a threshold signal; wherein said light-load signal is coupled to turn off said switching signals.

24. The method as claimed in claim 21, wherein a maximum on time of said power-switch set is limited by a maximum-on-time circuit.

* * * * *